A. JOHNSON.
MEANS FOR CONTROLLING THE PERIOD OF COOK OF PACKAGED PRODUCTS.
APPLICATION FILED AUG. 9, 1920.
1,380,805.
Patented June 7, 1921.
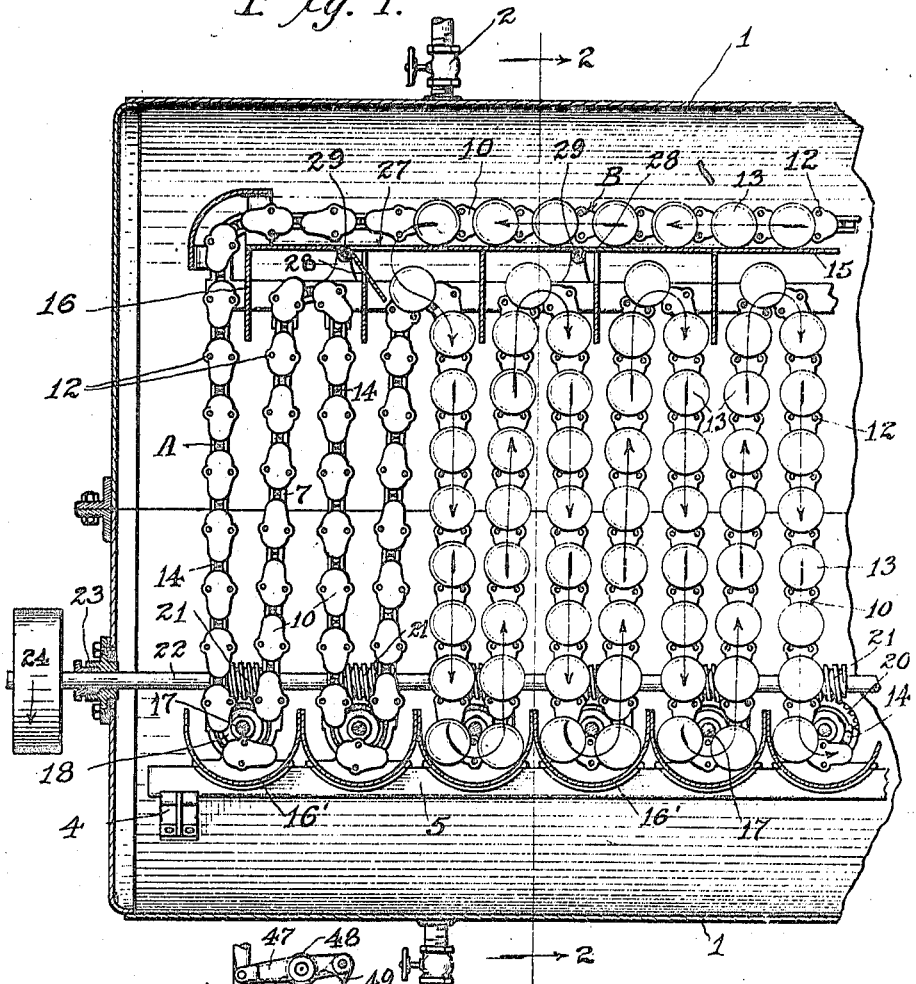
INVENTOR.
Axel Johnson
BY
ATTORNEYS.

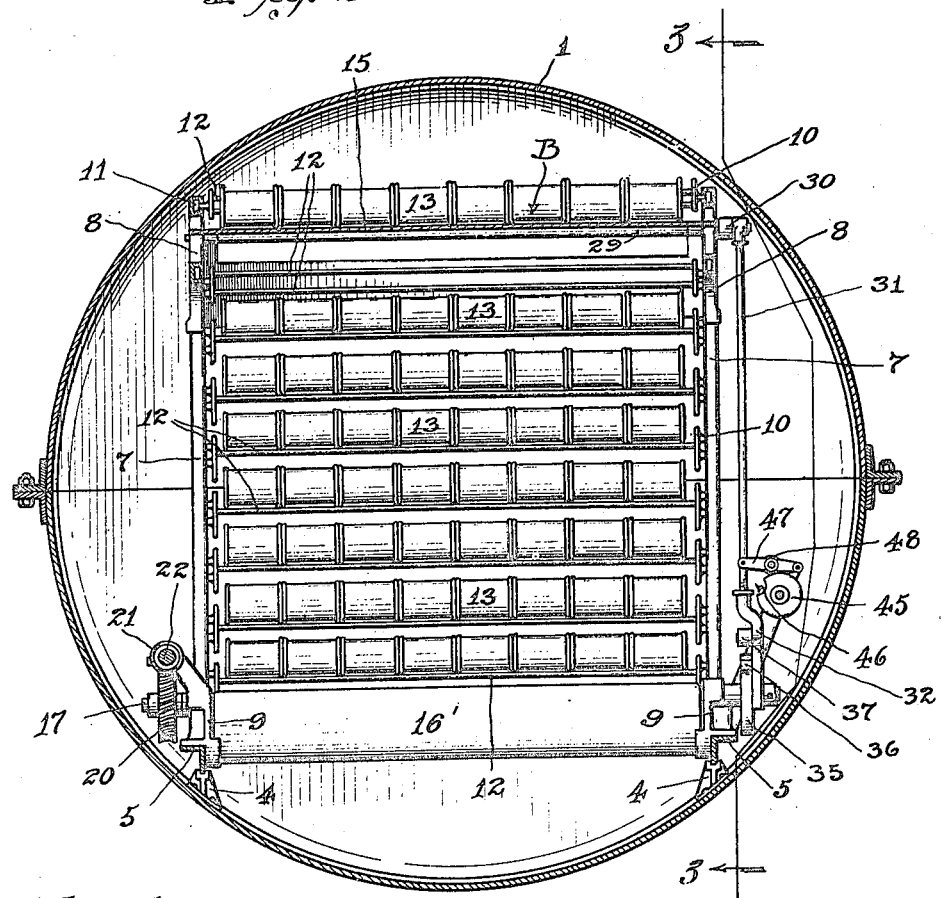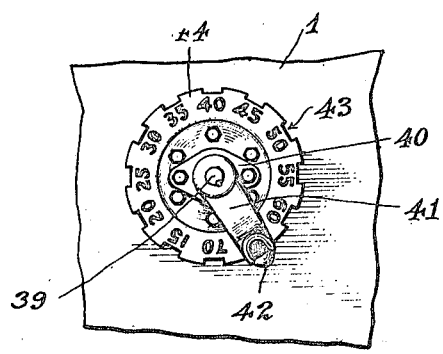

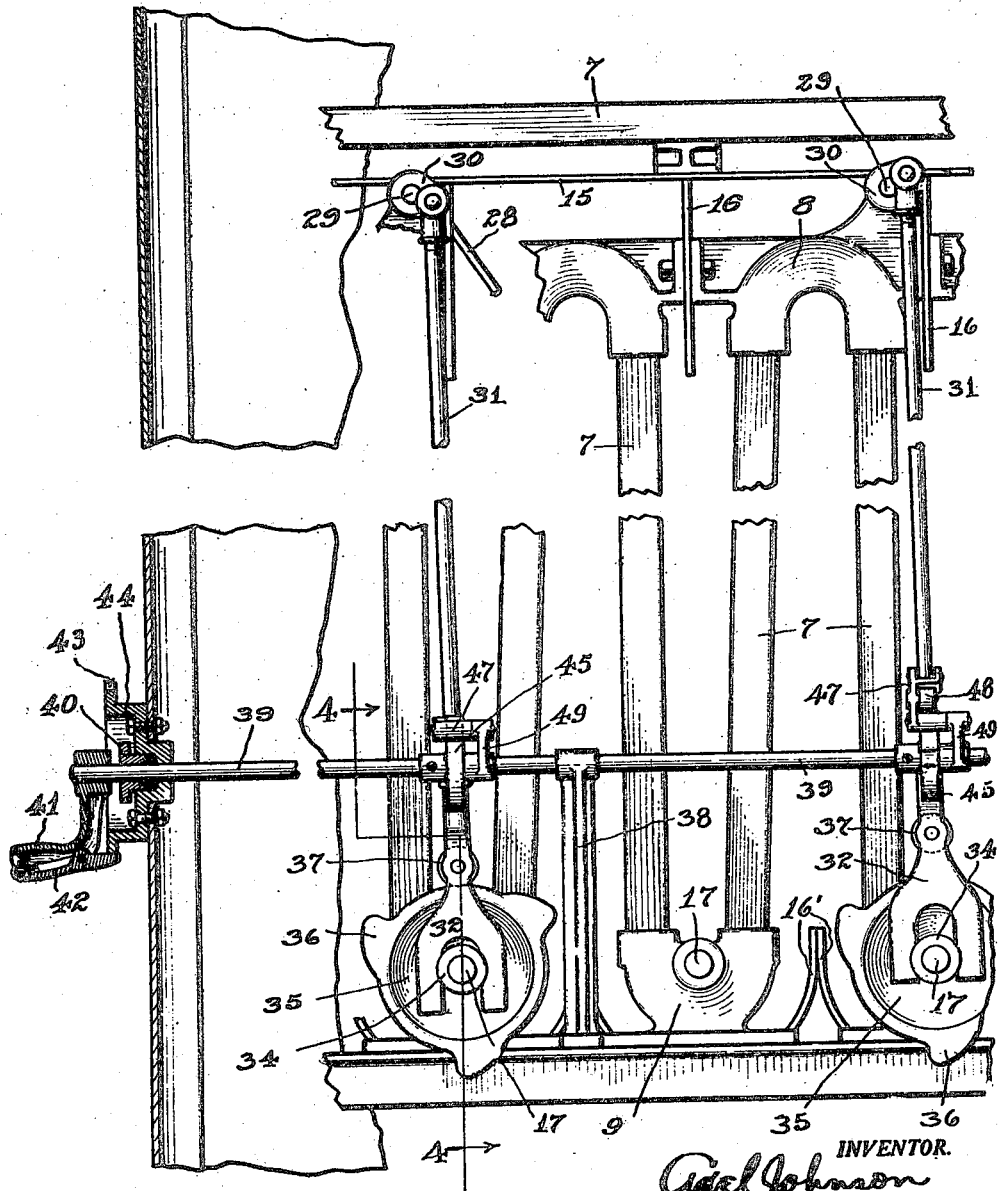

UNITED STATES PATENT OFFICE.

AXEL JOHNSON, OF OAKLAND, CALIFORNIA.

MEANS FOR CONTROLLING THE PERIOD OF COOK OF PACKAGED PRODUCTS.

1,380,805. Specification of Letters Patent. Patented June 7, 1921.

Application filed August 9, 1920. Serial No. 402,196.

*To all whom it may concern:*

Be it known that I, AXEL JOHNSON, a citizen of the United States, residing at Oakland, in the county of Alameda and State of California, have invented certain new and useful Improvements in Means for Controlling the Period of Cook of Packaged Products, of which the following is a specification.

My present invention relates to an apparatus for treating packaged goods, particularly canned goods, and is designed primarily for use in sterilizing and cooking foods contained in ordinary cylindrical cans.

The principal object of the invention consists in providing an improved apparatus wherein the packages or cans at the will of the operator can be directed within the apparatus to travel any desired distance through the cooking chamber, whereby the same apparatus may be utilized for treating or cooking different products, as it is well known that different foods require different lengths of time for proper cooking or treatment.

The main object of this invention is to provide an apparatus wherein the cans as conveyed through the cooking chamber are caused to travel in a zig-zag path, and wherein their movement through the chamber may be changed at pre-determined points by the operation of a suitable control mechanism extended externally of the apparatus. A further object is to provide a construction wherein a single operating mechanism controls the switching or transfer of the containers from one portion of the runway to another, and one so constructed that the operator is at all times aware of the point of transfer of the cans from one portion of the runway to another and is thereby apprised of the length of cook of the cans passing through the apparatus.

With he above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a vertical sectional view of one end of the preferred embodiment of my invention, illustrating the can guide flights and the gates for controlling the passage of the cans from one flight to another.

Fig. 2 is a transverse sectional view taken on line 2—2 of Fig. 1, viewed in the direction of the arrows, illustrating more particularly the gate controlling and operating means.

Fig. 3 is a vertical sectional view taken on line 3—3 of Fig. 2 disclosing more fully the operating means for the gates and the gate controlling mechanism.

Fig. 4 is a broken sectional view taken on line 4—4 of Fig. 3 viewed in the direction of the arrows, disclosing the conveyer operating means, the gate operating means, and one of the controlling members for changing the fulcrum point of the gate controlling mechanism.

Fig. 5 is a view in detail front elevation of the dial mechanism for indicating the period of cook of the cans within the cooking chamber dependent on the setting of the gate operating mechanism.

Referring more particularly to the drawings, wherein like characters of reference designate corresponding parts, the numeral 1 indicates a suitable cooking chamber, preferably cylindrical in transverse section, and the same is provided with the valve controlled steam inlet opening 2 and the valve controlled condensation or relief opening 3. Within the chamber or box 1 at opposite sides thereof, adjacent its base, are secured the rail supporting brackets 4 on which are mounted suitable supporting rails 5 carrying the can guide mechanism, hereinafter described. The endless can guide mechanism may be of any suitable construction, and formed and arranged in such manner that, in order to conserve space, the cans are caused to travel when conveyed the full length of the conveyer the greatest distance within the chamber or box prior to being discharged therefrom. While many forms of conveying mechanism may be employed, I prefer to use that form illustrated which consists in the channel tracks or guides 7 disposed in parallel opposing relation on opposite sides of the interior of the chamber or box 1, the same being preferably arranged to provide a conveyer consisting preferably of two portions, one in the form of a continuous zigzag and the other in the form of a straight runway disposed in communicating relation with corresponding ends of the respective zig-zags. In side elevation, some of the channel tracks or guides 7 are inclined, as in Fig. 3, and the same are connected at their upper ends by curved guides 8 also formed with channels, and at their lower ends by other curved guides 9 formed with channels. The endless conveyer coöperating with said guides consists in a plurality of independent can supporting frames formed at their opposite ends with the end plates 10, from the outer ends of which extend the headed members 11 received in the slots of the guides 7 and connecting members 8 and 9. The end plates of each frame are connected by the can supporting rods 12, Figs. 1 and 4 of the drawings, and on said supporting rods 12 are adapted to rest, as in Fig. 1 of the drawings, the cans 13 conveyed through the apparatus during the processing thereof. In order to maintain a uniform space between the headed ends of adjacent can supporting frames, I position within the slots of the guides 7 suitable disks 14 which are free to move within the slots, and which are in no manner connected with the headed ends 11 of the end plates 10.

From the present construction, it will be observed that I provide a plurality of vertical flights A over which lies a horizontal conveyer flight B, and which flight communicates with the upper ends of the respective vertical flights A. A dividing wall 15 separates the flights A and B, and the same is supported at the upper ends of the curved members 8, and is preferably carried by the plates 16 clamped between and extending upwardly from the members 8, as illustrated in Fig. 3 of the drawings, said plates depending between adjacent pairs of the vertical flights, as in Figs. 1 and 3 of the drawings. The dividing wall 15 serves as a support for the cans 13 during their conveying by the portion B of the endless conveyer, and said cans rest on the upper surface of the member 15 and roll between the rods 12 of adjacent frames, as clearly illustrated in Fig. 1.

At the lower ends of the respective pairs of vertical flights A at points beneath the connecting members 9 are suitably curved or troughed can supporting plates 16', which support the cans during their travel from the lower end of one vertical flight A to the lower end of an adjacent flight, as clearly illustrated in Fig. 1, and in operating the conveyer to insure a uniform even movement thereof, I prefer to employ the following mechanism. Extending transversely through opposing members 9 are rotatable shafts 17 carrying on their ends adjacent the inner faces of the members 9 suitable notched disks 18, and one end each of said shafts is provided with a worm gear 20 with which intermeshes a worm pinion 21 mounted on a shaft 22 extended longitudinally of the vertical conveyer flights A, and at one end projecting through a stuffing box 23 in the end wall of the chamber or box 1. The shaft 22 carries a band wheel 24 for receiving power from any suitable source to drive the same in the direction of the arrow, Fig. 1 of the drawings. The rotation of the shaft 22 in turn simultaneously rotates the shafts 17 at the same speed, and the notches 25 in the respective disks 18 engage in timed relation the spindle portion 26 of the headed ends 11 of the can conveying frames, moving the same in the direction of the arrow, Fig. 1 of the drawings. To enable the transfer of cans from one portion of the endless conveyer to another portion in order to regulate or control the length of cook of the contents thereof, and to enable an operator to easily adjust the mechanism to obtain the desired period of cook, I prefer to employ the following mechanism:—The plate 15 at intervals throughout the length of the horizontal conveyer flight B, and preferably at a point adjacent the upper ends of alternate vertical flights A, is provided with a plurality of can passages 27 each normally closed by a plate gate 28 pivotally mounted to swing on a fulcrum 29. Each gate at its end is provided with a crank 30 with which pivotally connects the upper end of an operating rod 31, said rod at its lower end mounting a bifurcated casting 32 offset from the plane of the rod 31. The bifurcated end 32 of the respective rods is received in a notched groove 33 in the hub 34 of a cam disk 35, one of which is mounted on each shaft 17. Each cam disk is provided at spaced and predetermined intervals about its periphery with a cam lug 36, which is adapted, on the rotation of the shaft, to contact with a wheel 37 carried on the inner face of the member 32 at a point above the shafts 17. Thus on each rotation of each shaft 17, the rod 31, so long as the roller 37 is permitted to ride on the periphery of the disk 35, is reciprocated a number of times causing an intermittent opening and closing of its associated gate 28. The cam surfaces 36 are arranged in such manner as to operate the rods 31 to close the associated gates 28 during such time as a can or a row of cans is conveyed on to the upper surface thereof, after which time the gate 28 is permitted to swing downwardly guiding the cans deposited thereon on to the desired flight of the conveyer.

The means for selecting the gate to be operated is preferably constructed in the following manner, and which construction insures the maintaining in closed position of all gates other than the one desired to be operated. At spaced points upwardly from the members 5 and extending at an incline outwardly are the frame members 38, providing a support and journal for a controlling shaft 39, one end of which extends through a gland 40 exteriorly of the chamber or box 1. Carried on the end of the shaft 39 is a suitable operating handle 41 carrying a spring held pivoted locking latch 42 engageable within the notches 43 formed in the periphery of a disk 44 secured to the exterior of the chamber or box 1 and surrounding the gland 40. The disk 44 carries on its surface indications denoting the length of period of cook of the cans as conveyed through the box in accordance with the setting of the handle 41, and the length of cook indicated by the setting of the handle in Fig. 5 is sixty-five minutes. The shaft 39 at points in line with the respective rods 31 carries a disk 45 having a single notch or recess 46 in its periphery, and said disks are arranged on the shaft 39 to position their respective notches 46 about said shaft to correspond to the position of the notches 43 in the member 44, with the notch of the disk 45 nearest the feed end of the box corresponding to the indication 15 on the dial, and the notch of the disk 45 associated with the last gate of the conveyer corresponding to the indication 70 on the disk 44. From each rod 31 extends at a point over the respective disks 45, a link 47 carrying a roller 48, and said link being pivotally connected at its outer end to a bracket or arm 49 supported by the shaft 39, and relatively to which said shaft rotates. It will be apparent that, on the rotation of the shaft 39, all of the disks 45 will be similarly rotated, positioning the respective disks 45 with their single notch 46 successively in coöperation with its associated roller 48. It will also be apparent that but one roller is capable of reception in its disk at a time, and at which time all the other rollers are carried on the periphery of their associated disks maintaining the gates 28 in closed position. Referring to Fig. 4, which illustrated the selected gate to be operated, it will be observed that the reception of the roller 48 within the slot 46 permits of an operating stroke being imparted by the cams 36 to the rod 31, which movement opens and closes the gate 28, and as long as the notch 46 is in the position indicated, said rod will operate, but on the movement of the disk 45 to expel the roller 48 from its notch 46, the roller 37 will be raised from coöperative relation with the cam lugs 36.

By my construction, it will be apparent that on a uniform travel being imparted to the endless conveyer, the operator is enabled to grasp the handle 41 and rotate the shaft 39 to regulate or control, from the exterior of the apparatus, the period of cook of the cans conveyed through the box, and by the operation of said handle is enabled to obtain any desired cook within a considerable range.

In the illustration of my invention, I have deemed it unnecessary to show feed and discharge gates for the box, as any suitable form of feed and discharge mechanism well known in this art may be employed.

I claim:—

1. A continuous cooker comprising a box, means for heating the same, a can conveyer within the box disposed to form a continuous zig-zag path, with adjacent points in communicating relation, a plurality of can transfer gates disposed within the length of said conveyer for receiving and transferring cans from one flight to another, and means common to all of said gates and extending exteriorly of the box for selectively controlling the operation thereof.

2. A continuous cooker comprising a box, means for heating the same, a can conveyer within the box disposed to form a continuous zig-zag path, with adjacent points in communicating relation, a plurality of can transfer gates disposed within the length of said conveyer for receiving and transferring cans from one flight to another, means common to all of said gates and extending exteriorly of the box for selectively controlling the operation thereof, and an indicating mechanism visible from the exterior of the box and associated with said means for indicating the selected gate to be operated.

3. A continuous cooker comprising a box, means for heating the same, a can conveyer within the box disposed to form a continuous zig-zag path, with adjacent points in communicating relation, a plurality of pivotally mounted transfer gates disposed within the length of said conveyer for transferring cans from one flight to another, an operating rod extended from each gate, a rod operating means coöperating with each rod for actuating the same to pivot its coöperating gate, and means common to all of said rods and extending exteriorly of the box for selectively throwing said rods out of operating relation with their operating means and maintaining said gates in closed position.

4. A continuous cooker comprising a box, means for heating the same, a can conveyer within the box disposed to form a continuous zig-zag path with adjacent flights in communicating relation, a can transfer gate disposed between adjacent flights of said conveyer for receiving, directing, and conveying cans from one flight to another, and means for swinging said gates during the transfer to deliver cans at timed intervals from one conveyer flight to another.

5. A continuous cooker comprising a box, means for heating the same, a can conveyer within the box disposed to form a continuous zig-zag path with adjacent flights in communicating relation, a pivotally mounted can transfer gate disposed between adjacent flights of said conveyer for receiving, directing and conveying cans from one flight to another, means for swinging said gate during the transfer to deliver cans at timed intervals from one conveyer flight to the other, and mechanism associated with the gate and operatable from the exterior of the box for throwing the gate to closed position and out of operative relation with said swinging means.

6. A continuous cooker comprising a box, means for heating the same, a can conveyer within the box disposed to form a continuous zig-zag path, one portion of said conveyer being disposed at an angle to the remainder of the conveyer in communicating relation therewith, means for normally separating said two portions of said conveyer, a plurality of gates in said separating means for controlling the passage of receptacles from one to the other portion of said conveyer at a plurality of points within the length thereof, and mechanism common to all of said gates and extending exteriorly of said box for operation to selectively control the opening and closing of said gates.

7. A continuous cooker comprising a box, means for heating the same, a can conveyer within the box disposed to form a continuous zig-zag path, one portion of said conveyer being disposed at an angle to the remainder of the conveyer in communicating relation therewith, means for normally separating said two portions of said conveyer, a plurality of swinging gates in said separating means for controlling the passage of receptacles from one to the other portion of said conveyer at a plurality of points within the length thereof, a rod associated with each gate, a cam coöperating with each rod, and a common mounting for said cams extended exteriorly of the box and capable of operation to selectively control the operation of said gates.

In testimony whereof I have signed my name to this specification.

AXEL JOHNSON.